(12) United States Patent
Ishikawa et al.

(10) Patent No.: US 9,853,510 B2
(45) Date of Patent: Dec. 26, 2017

(54) PERMANENT MAGNET-EMBEDDED ELECTRICAL MOTOR, COMPRESSOR, AND REFRIGERATING AIR CONDITIONING DEVICE

(71) Applicant: Mitsubishi Electric Corporation, Tokyo (JP)

(72) Inventors: Atsushi Ishikawa, Tokyo (JP); Kazuhiko Baba, Tokyo (JP); Masahiro Nigo, Tokyo (JP); Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/031,298

(22) PCT Filed: Dec. 19, 2014

(86) PCT No.: PCT/JP2014/083720
§ 371 (c)(1),
(2) Date: Apr. 22, 2016

(87) PCT Pub. No.: WO2015/093598
PCT Pub. Date: Jun. 25, 2015

(65) Prior Publication Data
US 2016/0261154 A1    Sep. 8, 2016

(30) Foreign Application Priority Data

Dec. 20, 2013  (WO) .................. PCT/JP2013/084323

(51) Int. Cl.
*H02K 1/27*    (2006.01)
*F25B 31/02*   (2006.01)

(52) U.S. Cl.
CPC ........... *H02K 1/2766* (2013.01); *F25B 31/02* (2013.01); *H02K 2213/03* (2013.01)

(58) Field of Classification Search
CPC   H02K 1/22; H02K 1/24; H02K 1/246; H02K 1/27; H02K 1/276; H02K 1/2766; H02K 21/12; H02K 21/14; H02K 21/16
(Continued)

(56) References Cited

U.S. PATENT DOCUMENTS 5,510,662 A *  4/1996  Tanimoto ............... H02K 21/14
                                              310/156.53
2002/0036436 A1*  3/2002  Koharagi ............. H02K 1/2766
                                              310/156.53
2013/0257210 A1*  10/2013  Hattori ................ H02K 1/2766
                                              310/156.08

FOREIGN PATENT DOCUMENTS

CN        1098568 A     2/1995
CN     103404001 A    11/2013
(Continued)

OTHER PUBLICATIONS

Office Action dated Apr. 5, 2017 issued in corresponding JP patent application No. 2015-553623.
(Continued)

*Primary Examiner* — Tran Nguyen
(74) *Attorney, Agent, or Firm* — Posz Law Group, PLC (57) ABSTRACT

An interior permanent magnet motor includes a stator and a rotor rotatably arranged so as to be opposed to the stator. The rotor includes a rotor core having a plurality of magnet insertion holes formed therein, into which corresponding permanent magnets are respectively inserted. The plurality of permanent magnets and the plurality of magnet insertion holes are each formed into an arc shape that is convex toward a center side of the rotor. When a shortest distance between the adjacent magnet insertion holes is defined as an inter-pole shortest distance (L), a ratio of the inter-pole shortest distance (L) to an outer diameter (D) of the rotor is $0.035 \leq L/D \leq 0.045$.

6 Claims, 9 Drawing Sheets

(58) Field of Classification Search
USPC .................................... 310/156.53–156.57
See application file for complete search history.

(56) References Cited

FOREIGN PATENT DOCUMENTS

| | | |
|---|---|---|
| JP | 2000-333391 A | 11/2000 |
| JP | 2001-218404 A | 8/2001 |
| JP | 4398906 B2 | 1/2009 |
| JP | 2009-44860 A | 2/2009 |
| JP | 4580683 B2 | 11/2010 |
| JP | 2013-212035 A | 10/2013 |
| WO | 2013/128970 A1 | 9/2013 |

OTHER PUBLICATIONS

International Search Report of the International Searching Authority dated Mar. 31, 2015 for the corresponding international application No. PCT/JP2014/083720 (and English translation).
Office Action dated Sep. 20, 2016 issued in corresponding JP patent application No. 2015-553623 (and English Translation).
Office Action dated Sep. 15, 2017 issued in corresponding CN patent application No. 201480065466.8 (and English translation).

* cited by examiner

PERMANENT MAGNET-EMBEDDED ELECTRICAL MOTOR, COMPRESSOR, AND REFRIGERATING AIR CONDITIONING DEVICE

CROSS REFERENCE TO RELATED APPLICATIONS

This application is a U.S. national stage application of International Application No. PCT/JP2014/083720 filed on Dec. 19, 2014, which is based on and claims priority to International Application No. PCT/JP2013/084323 filed on Dec. 20, 2013, the disclosures of which are incorporated herein by reference.

TECHNICAL FIELD

The present invention relates to an interior permanent magnet motor, a compressor, and a refrigeration and air conditioning apparatus.

BACKGROUND ART

In recent years, highly efficient motors have been demanded along with an increase in awareness of energy saving, and there have been proposed a large number of interior permanent magnet motors using rare-earth magnets having high residual flux density and coercivity in a rotor to realize high efficiency. Further, with structure in which the magnets are embedded in the rotor, a reluctance torque as well as a magnet torque can be used, thereby being capable of constructing the highly efficient motor. The reluctance torque is proportional to a difference in inductance between a d-axis (center axis of the permanent magnet) and a q-axis (axis extending between the adjacent magnets and forming an electrical angle of 90 deg. with respect to the d-axis). Thus, in order to improve the reluctance torque, in general, structure in which a q-axis magnetic flux easily passes therethrough and a d-axis magnetic flux less easily passes therethrough is desired.

For example, in the technology disclosed in Patent Literature 1, a shortest distance of an interval between adjacent flat-plate magnets is set larger than a shortest distance between adjacent side surfaces of teeth. In this manner, a magnetic flux in a q-axis direction is increased to generate a large reluctance torque.

Further, in the technology disclosed in Patent Literature 2, the flat-plate magnets are arranged into V-shapes to generate the reluctance torque.

CITATION LIST

Patent Literature

[PTL 1] JP 4398906 B2
[PTL 2] JP 4580683 B2

SUMMARY OF INVENTION

Technical Problem

However, the rare-earth magnets have problems of supply risk and price increase of Nd (neodymium) and Dy (dysprosium) that are main components of the rare-earth magnets. The motor using the rare-earth magnets is also influenced by such problems of supply risk and cost increase.

Regarding those problems, there is a measure to use ferrite magnets, which are inexpensive and contain an iron oxide as a main component, instead of the rare-earth magnets. However, a residual flux density of the ferrite magnets is about ⅓ of a residual flux density of the rare-earth magnets. Thus, a magnetic force of the magnet becomes about ⅓.

Further, in order to maximize the performance of the interior permanent magnet motor, it is important to achieve excellent demagnetization resistance as well as a high output torque.

The present invention has been made in view of the above, and has an object to provide an interior permanent magnet motor, which is excellent in demagnetization resistance and is capable of maintaining a high output torque without relying on a high residual flux density of rare-earth magnets.

Solution to Problem

In order to achieve the object described above, according to one embodiment of the present invention, there is provided an interior permanent magnet motor, including: a stator; and a rotor rotatably arranged so as to be opposed to the stator, in which the rotor includes a rotor core having a plurality of magnet insertion holes formed therein, into which corresponding permanent magnets are respectively inserted, in which the plurality of permanent magnets and the plurality of magnet insertion holes are each formed into an arc shape that is convex toward a center side of the rotor, and in which, when a shortest distance between the adjacent magnet insertion holes is defined as an inter-pole shortest distance (L), a ratio of the inter-pole shortest distance (L) to an outer diameter (D) of the rotor is $0.035 \leq L/D \leq 0.045$.

Further, it is preferred that the permanent magnets be ferrite magnets.

A center of an arc of a radially-inner insertion hole contour surface of the magnet insertion hole and a center of an arc of a radially-outer insertion hole contour surface of the magnet insertion hole may coincide with each other.

Further, in order to achieve the same object, according to one embodiment of the present invention, there is provided a compressor including, in an airtight container: a motor; and a compression element. The motor is the above-mentioned interior permanent magnet motor of the one embodiment of the present invention.

Further, in order to achieve the same object, according to one embodiment of the present invention, there is provided a refrigeration and air conditioning apparatus including the above-mentioned compressor of the one embodiment of the present invention as a component of a refrigeration cycle.

Advantageous Effects of Invention

According to the present invention, it is possible to provide the interior permanent magnet motor, which is excellent in demagnetization resistance and is capable of maintaining a high output torque without relying on a high residual flux density of the rare-earth magnets.

DESCRIPTION OF EMBODIMENTS

Now, embodiments of the present invention are described referring to the accompanying drawings. Note that, in the drawings, the same reference symbols represent the same or corresponding parts. Note that, FIG. 2 to FIG. 5 are all views corresponding to a part of an entire configuration in the illustration of FIG. 1, and for the sake of clarity of illustration, the hatching is omitted.

First Embodiment

Figure 1:
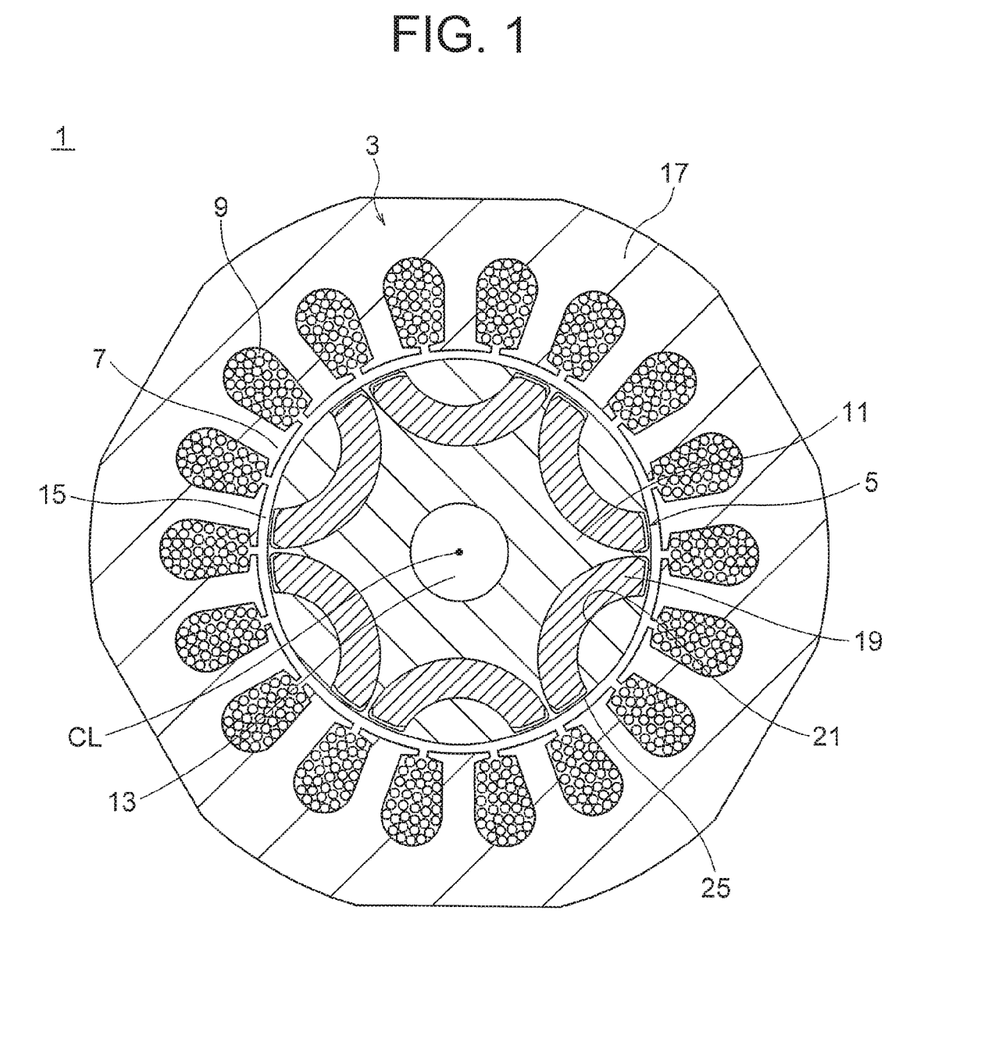
FIG. 1 is a view for illustrating a cross-section orthogonal to a rotation center line of an interior permanent magnet motor according to a first embodiment of the present invention.
Figure 2:
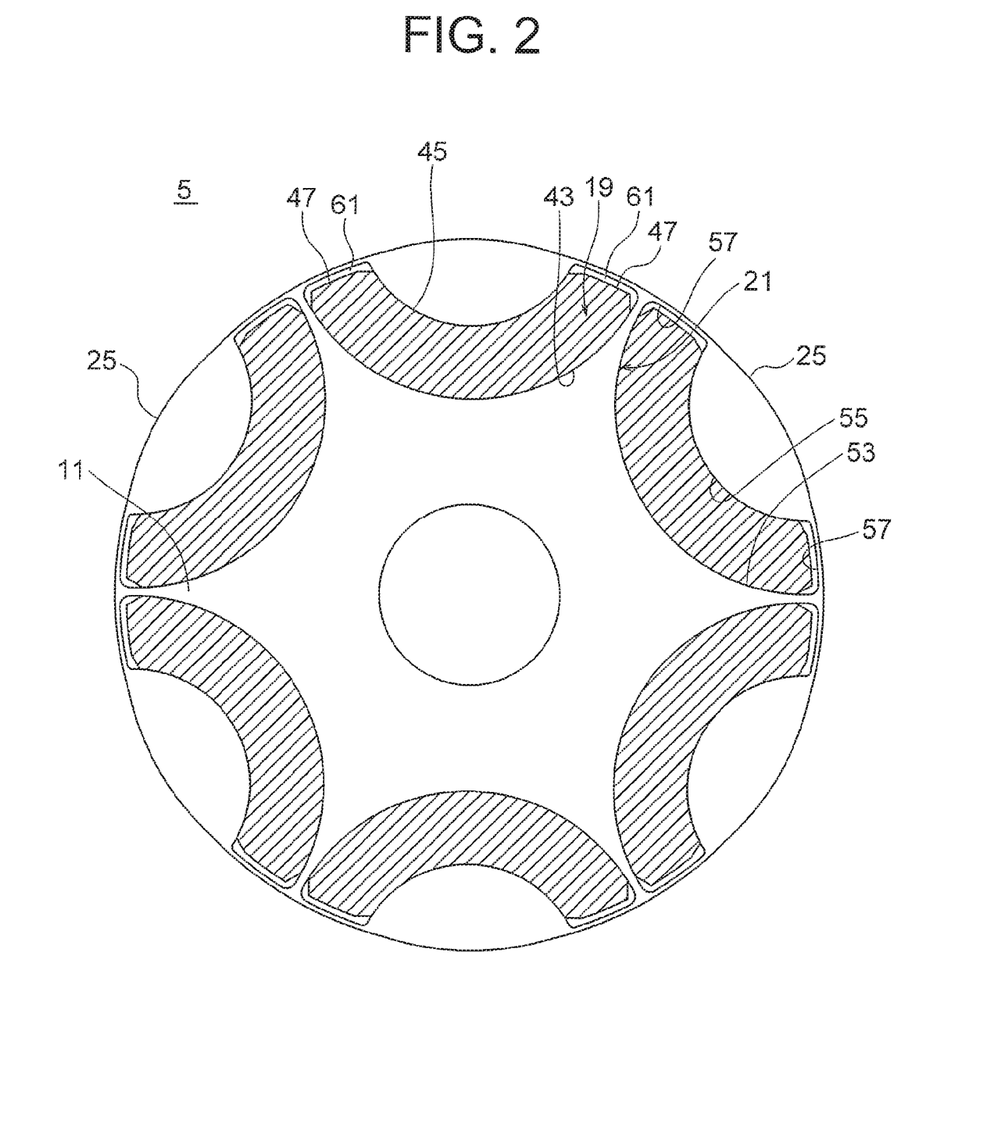
FIG. 2 is a view for illustrating a rotor alone in FIG. 1 in an enlarged manner.

FIG. 1 is a view for illustrating a cross-section orthogonal to a rotation center line of an interior permanent magnet motor according to a first embodiment of the present invention. FIG. 2 is a view for illustrating a rotor alone in FIG. 1 in an enlarged manner.

An interior permanent magnet motor 1 includes a stator 3 and a rotor 5 rotatably arranged so as to be opposed to the stator 3. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction.

A stator winding 3a is wound around each of the plurality of tooth portions 7 by a so-called distributed winding method. The distributed winding method is a method of winding a wire in a distributed manner for each of the plurality of tooth portions 7 of the stator 3. This distributed winding method has an excellent feature in using a reluctance torque as compared to a concentrated winding method.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor 5 and an inner peripheral surface of the stator 3.

In such a configuration, the rotor 5 is held on an inner side of the stator 3 through intermediation of the air gap 15 so as to be rotatable about a rotation center line CL (rotation center of the rotor, axial line of the shaft). Specifically, a current having a frequency synchronized with an instructed number of revolutions is supplied to the stator 3 to generate a rotation magnetic field, thereby rotating the rotor 5.

Configurations of the stator 3 and the rotor 5 are described in detail. The stator 3 includes a stator core 17. The stator core 17 is formed by punching magnetic steel plates into a predetermined shape, and laminating a predetermined number of the magnetic steel plates while fastening the magnetic steel plates by caulking.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by punching magnetic steel plates into a predetermined shape, and laminating a predetermined number of the magnetic steel plates while fastening the magnetic steel plates by caulking.

Inter-pole thin portions 18 (refer to FIG. 4) having a uniform thickness are each secured between a rotor outer peripheral surface 25 and a side-end insertion hole contour surface 57 described later. Those inter-pole thin portions 18 each serve as a path for a leakage magnetic flux between the adjacent magnetic poles, and hence it is preferred that the inter-pole thin portion 18 have a thickness as small as possible.

A plurality of permanent magnets 19, which are magnetized so that the N poles and the S poles are alternately positioned, are arranged in the rotor core 11. Referring to FIG. 1, each of the permanent magnets 19 is formed of a sintered ferrite magnet, curved into an arc shape, and arranged so that a convex portion side of the arc shape faces the center side of the rotor 5. In more detail, magnet insertion holes 21 as many as the number of the plurality of permanent magnets 19 are formed in the rotor core 11. The corresponding permanent magnets 19 are inserted into a plurality of the magnet insertion holes 21, respectively.

The permanent magnets 19 are formed of the ferrite magnets. The ferrite magnets each contain an iron oxide ($Fe_2O_3$) as a main component. Thus, the ferrite magnets are inexpensive and the suppliability is stable as compared to rare-earth magnets to be used in a general interior permanent magnet motor. Further, the ferrite magnets are each easily formed into a magnet having an arc shape, thereby being capable of forming magnets insertable also into magnet insertion holes each having an inverted arc shape as in this embodiment.

Both of the plurality of permanent magnets 19 and the plurality of magnet insertion holes 21 are each formed into an inverted arc shape curved reversely to an arc of the rotor outer peripheral surface 25 in a radially inward-outward direction. That is, the plurality of permanent magnets 19 and the plurality of magnet insertion holes 21 are each formed into an arc shape convex toward the center side of the rotor 5 (concave toward the radially outer side, that is, the rotor outer peripheral surface 25 side). Further, as illustrated in FIG. 1, one permanent magnet 19 is inserted into one magnet insertion hole 21.

The number of magnetic poles of the rotor 5 may be any number as long as the number of poles is two or more. In this description, the configuration of six poles is described as an example. As illustrated in FIG. 1 and FIG. 2, in the rotor 5, six magnet insertion holes 21 are formed away from each other equiangularly. That is, the six magnet insertion holes 21 are each arranged away from the adjacent magnet insertion hole 21 by an angular distance of 60°. Further, regarding directions of the magnetic pole in the radial direction, six permanent magnets 19 are arranged so that the N poles and the S poles are alternately positioned along a rotor circumferential direction.

Figure 3:
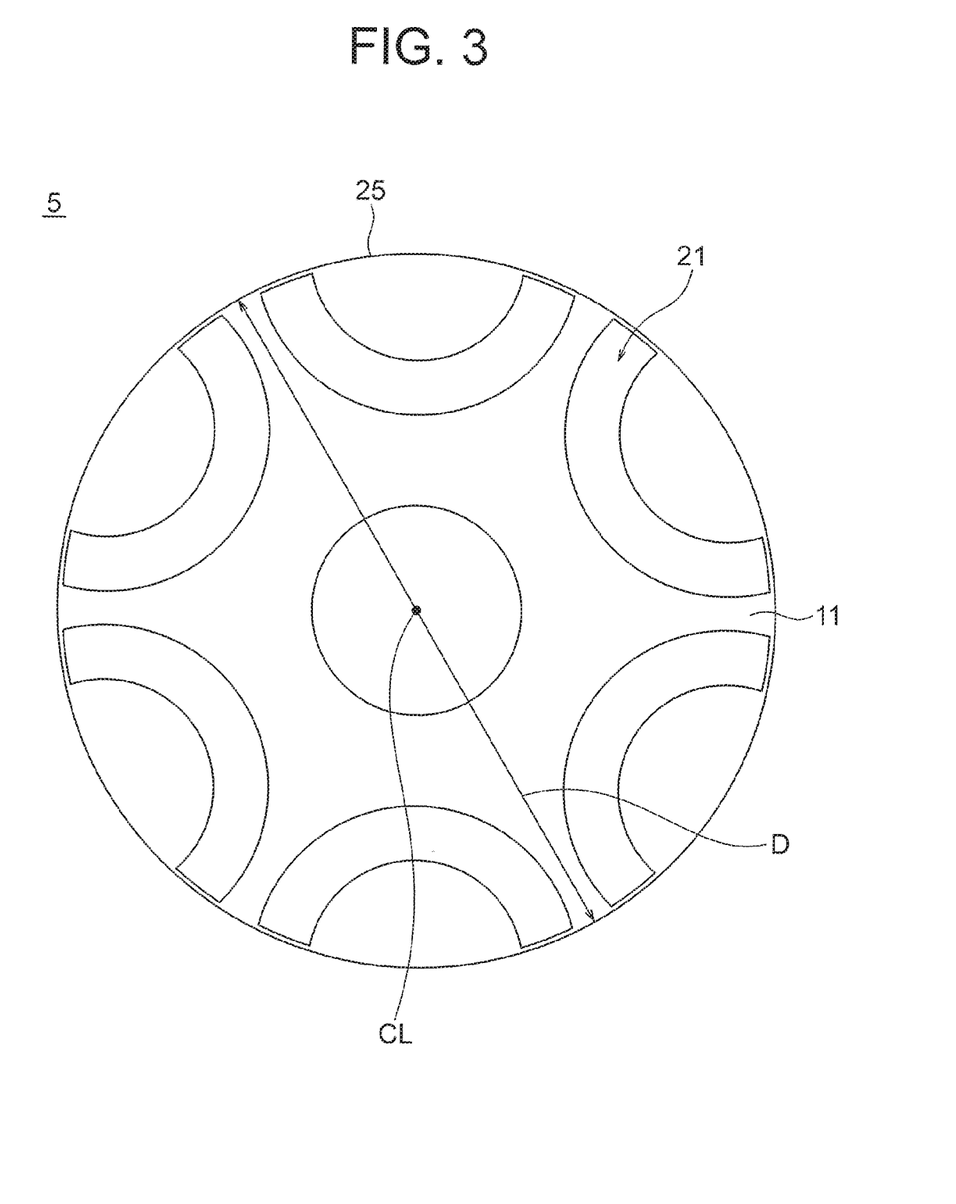
FIG. 3 is a view for illustrating an outer diameter of a rotor core.
Figure 4:
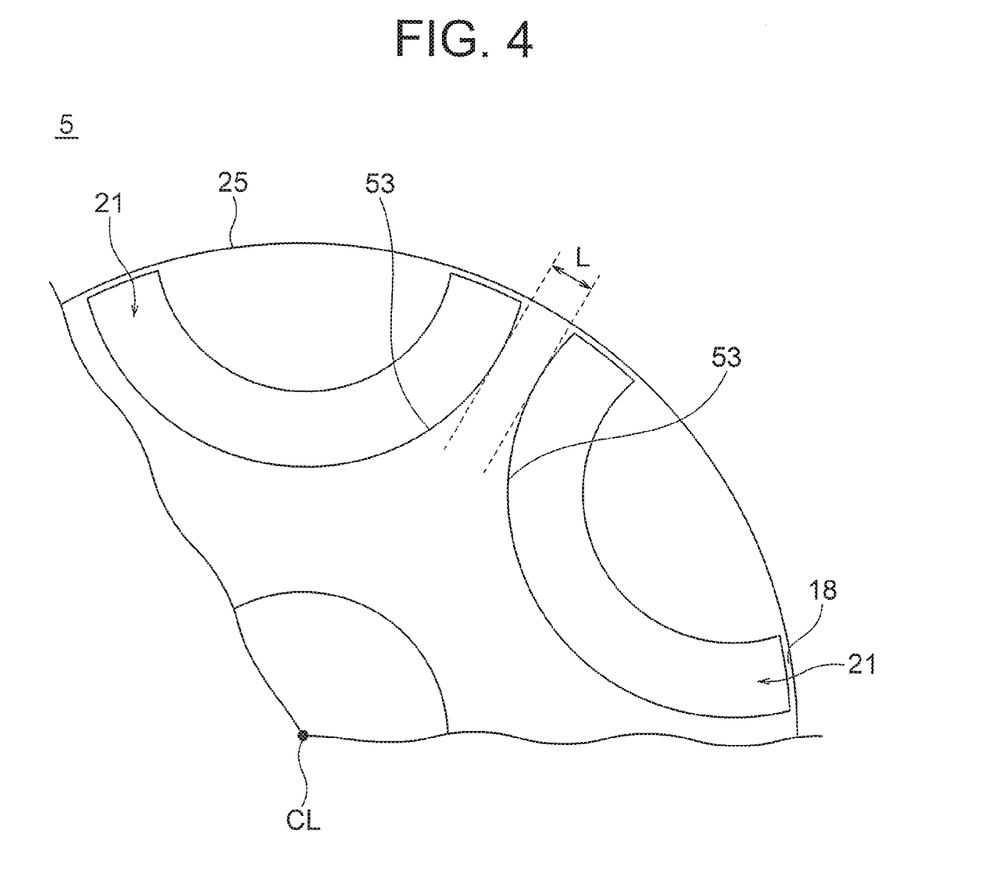
FIG. 4 is a view for illustrating a shortest distance between adjacent magnet insertion holes.
Figure 5:
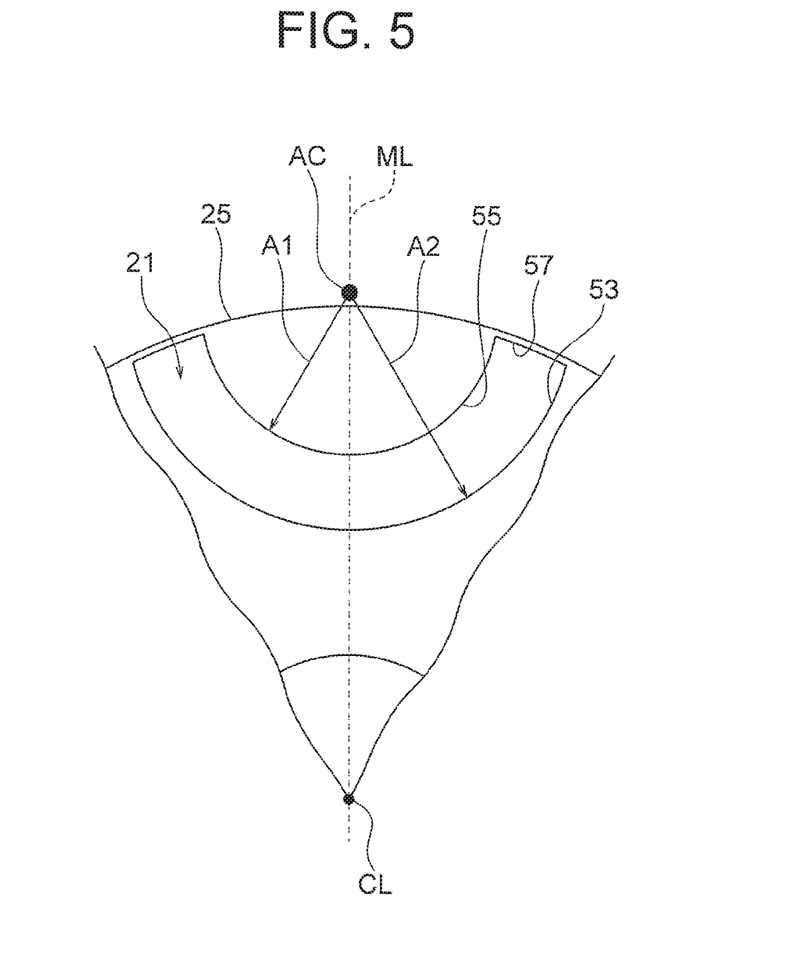
FIG. 5 is a view for illustrating a curved pattern of the magnet insertion hole.

Next, details of the permanent magnets and the magnet insertion holes are described. FIG. 3 is a view for illustrating an outer diameter of the rotor core. FIG. 4 is a view for illustrating a shortest distance between the adjacent magnet insertion holes. FIG. 5 is a view for illustrating a curved pattern of the magnet insertion hole.

The permanent magnets 19 each have a radially-inner magnet contour surface 43, a radially-outer magnet contour surface 45, and a pair of side-end magnet contour surfaces 47. Further, the magnet insertion holes 21 each have a radially-inner insertion hole contour surface 53, a radially-outer insertion hole contour surface 55, and a pair of side-end insertion hole contour surfaces 57.

As illustrated in FIG. 2, under a state in which the permanent magnet 19 is inserted into the corresponding magnet insertion hole 21, air gap portions 61 are formed each between the side-end magnet contour surface 47 and the side-end insertion hole contour surface 57. Further, the radially-outer magnet contour surface 45 and the radially-outer insertion hole contour surface 55 are held in contact with each other, and the radially-inner magnet contour surface 43 and the radially-inner insertion hole contour surface 53 are held in contact with each other.

The radially-outer insertion hole contour surface 55 is formed by a first arc surface having a first arc radius A1. On the other hand, the radially-inner insertion hole contour surface 53 is formed by a second arc surface having a second arc radius A2.

The first arc radius A1 and the second arc radius A2 have a common radius center AC, and the common radius center is located on the radially outer side with respect to the magnet insertion hole 21 and on a corresponding magnetic pole center line ML. In other words, the radially-inner insertion hole contour surface 53 and the radially-outer insertion hole contour surface 55 are formed concentrically. As described above, the center of an arc of the radially-inner insertion hole contour surface 53 and the center of an arc of the radially-outer insertion hole contour surface 55 coincide with each other, thereby improving the productivity of the rotor core 11 and the permanent magnets 19 to be inserted into the rotor core 11.

Further, when viewed in the cross-section having the rotation center line CL of the rotor 5 as the normal, the permanent magnet 19 and the magnet insertion hole 21 are each formed to be line symmetric across the corresponding magnetic pole center line ML.

In this case, a magnetic path between the adjacent magnet insertion holes 21 is defined as an inter pole, and a shortest distance between the adjacent magnet insertion holes 21 is defined as an inter-pole shortest distance L. In this embodiment, the inter-pole shortest distance L corresponds to a shortest distance between the radially-inner insertion hole contour surfaces 53 of the adjacent magnet insertion holes 21. Further, in the first embodiment, a ratio of the inter-pole shortest distance L to a rotor outer diameter D is 0.035≤L/D≤0.045. Characteristics of the interior permanent magnet motor 1 in the first embodiment, which is constructed as described above, are further described below.

Figure 6:
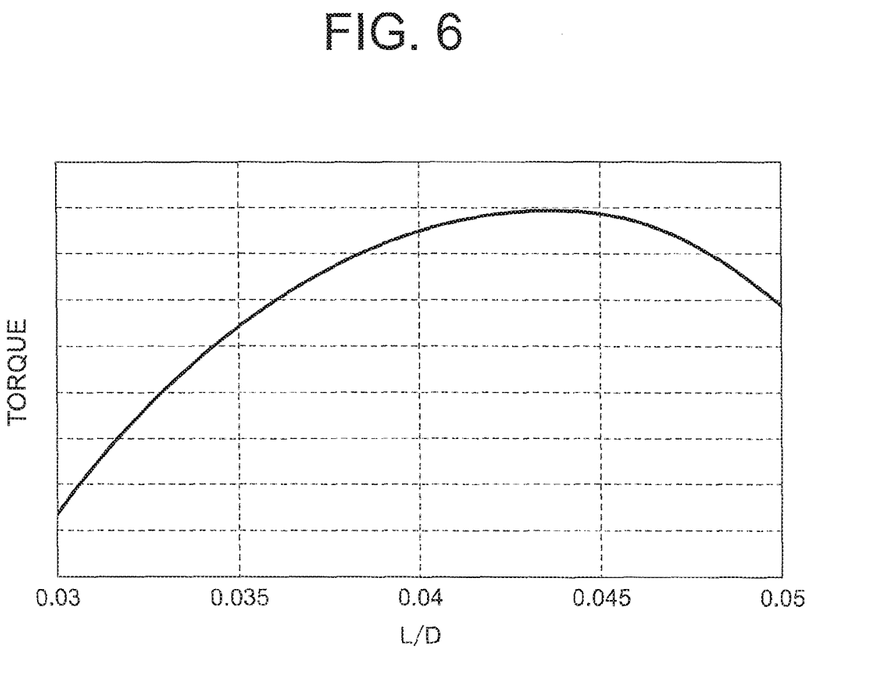
FIG. 6 is a graph for showing a characteristic of the motor, specifically showing change in output torque of the motor when L/D is set as a parameter.
Figure 7:
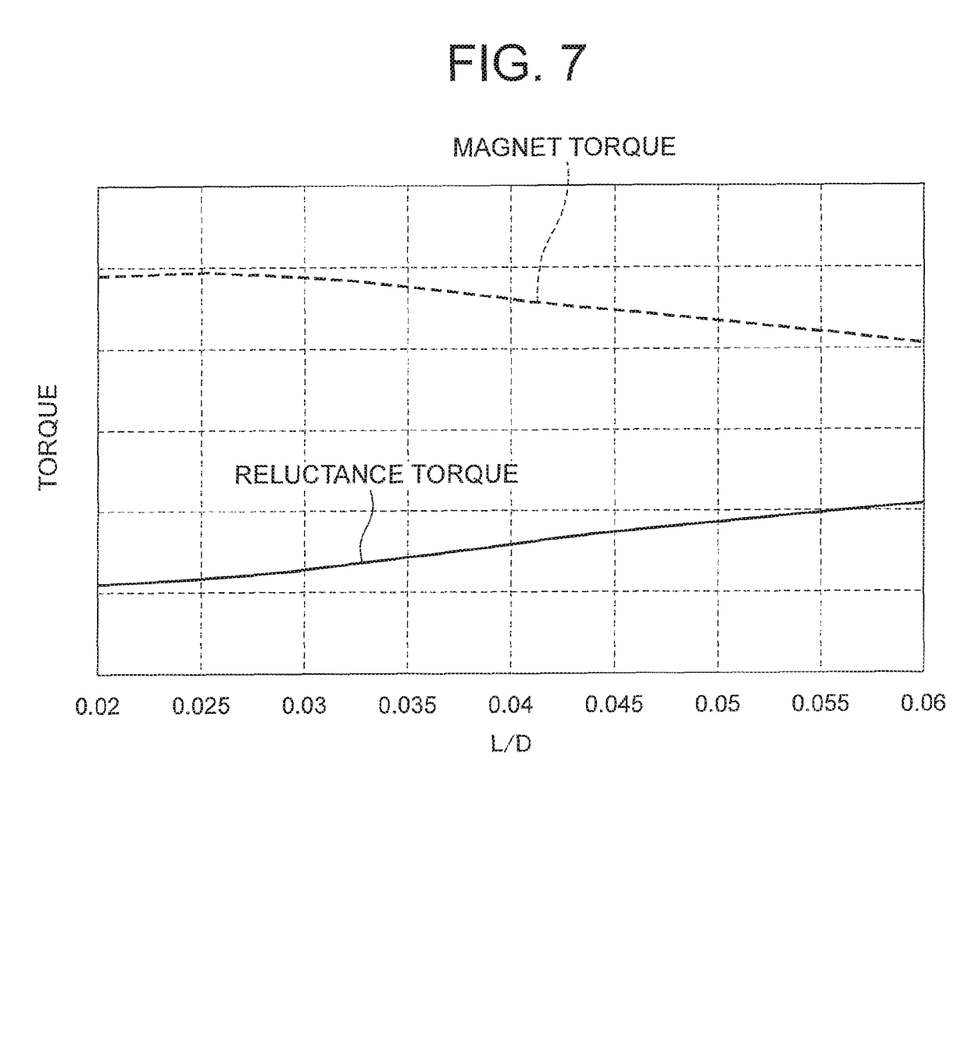
FIG. 7 is a graph for showing change in magnet torque and reluctance torque when L/D is set as a parameter.
Figure 8:
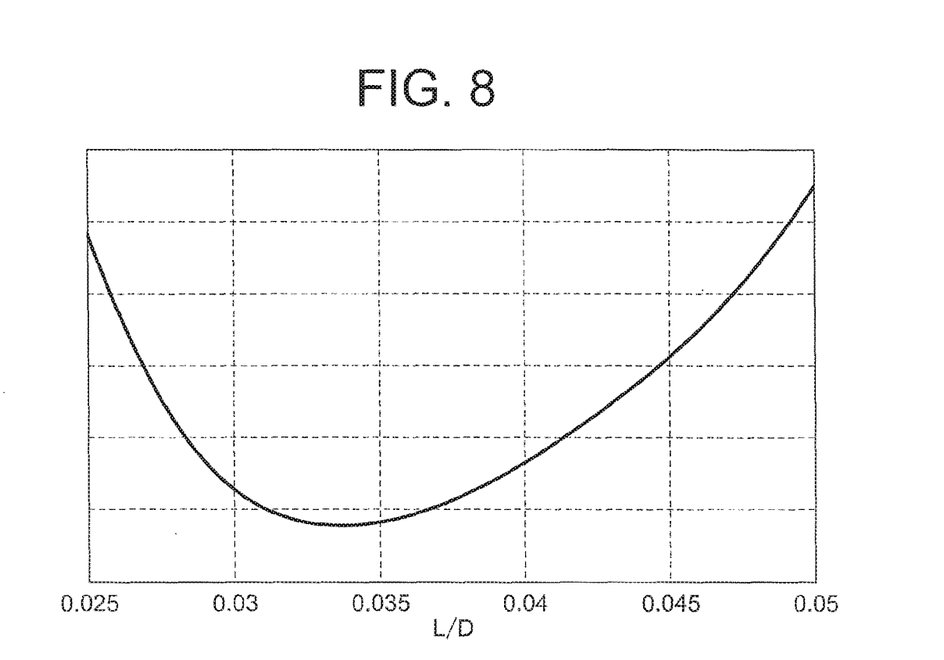
FIG. 8 is a graph for showing change in torque ripple when L/D is set as a parameter.
Figure 9:
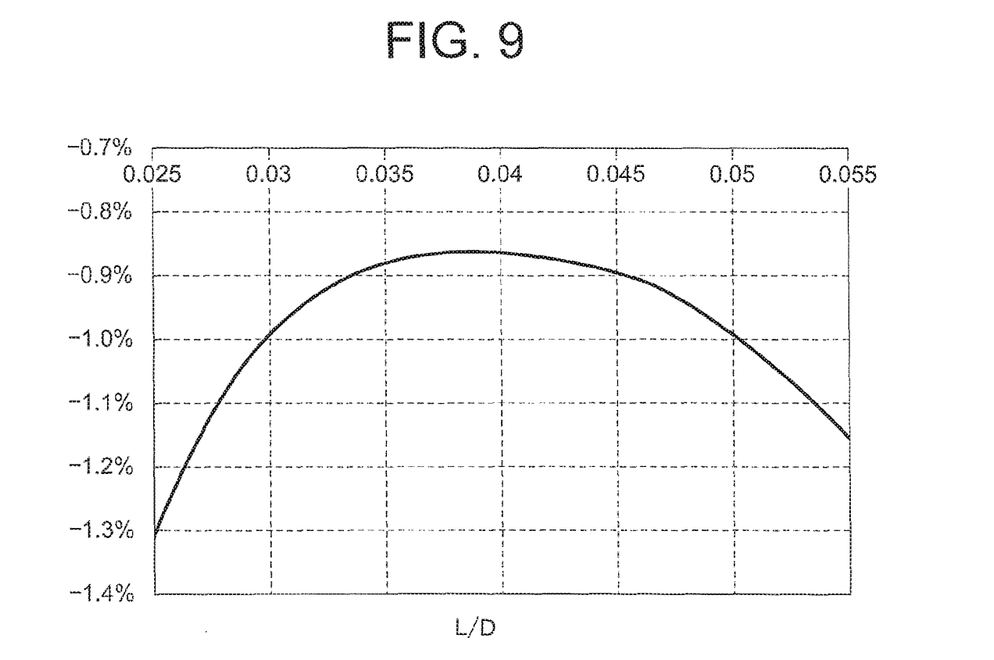
FIG. 9 is a graph for showing a demagnetization factor when L/D is set as a parameter.

FIG. 6 is a graph for showing a characteristic of the motor, specifically, showing change in output torque of the motor when L/D is set as a parameter, and FIG. 7 is a graph for showing change in magnet torque and reluctance torque when L/D is set as a parameter. FIG. 8 is a graph for showing change in torque ripple when L/D is set as a parameter. FIG. 9 is a graph for showing a demagnetization factor when L/D is set as a parameter.

The output torque of the motor in FIG. 6 can be determined independently of the magnet torque and the reluctance torque in FIG. 7. Further, the torque shown in FIG. 6 is an output torque of the motor at the same current value. As the output torque is increased, a current for generating a target torque can be reduced, thereby being capable of reducing a copper loss. Therefore, it is desired that the value of the torque be larger. As shown in FIG. 6, it is understood that the output torque of the motor has an extremal value with respect to L/D. It can be understood that the output torque of the motor has the extremal value from respective characteristics of the magnet torque and the reluctance torque shown in FIG. 7. As shown in FIG. 7, when L/D is increased, the magnet torque tends to decrease, whereas the reluctance torque tends to increase. With this, the reduction in magnet torque, which is caused due to the increase in inter-pole shortest distance L, can be compensated for by the increase in reluctance torque. More specific description is given. Through the increase in inter-pole shortest distance L, a magnetic flux in a q-axis direction easily passes through the inter pole, and along with increase in q-axis inductance, the reluctance torque can be improved. However, on the other hand, when the inter-pole shortest distance L is increased, the magnetic resistance of the inter pole is reduced so that the magnetic flux from the magnet easily flows to the inter pole through a rotor thin portion without passing through the stator. As a result, the magnetic flux leaks, thereby reducing the magnet torque generated due to the magnetic flux from the magnet. To cope with such a phenomenon, in the first embodiment, the interior permanent magnet motor 1 is constructed so as to satisfy a relationship of 0.035≤L/D≤0.05. In this manner, the reduction in magnet torque can be compensated for by the reluctance torque, and finally, the combined torque can be maintained to be high. Further, when L/D=0.05, there are advantages in that a large reluctance torque can be obtained, that the magnet can be downsized through the increase in inter-pole shortest distance L, and that an effect of reducing costs of the magnets is also obtained.

Further, the torque ripple in FIG. 8 is an indicator of fluctuation of the torque during rotation. The increased torque ripple becomes a factor of noise and vibration during an operation. Thus, it is desired that the torque ripple be smaller. Further, the demagnetization factor in FIG. 9 indicates a percentage of decrease of the amount of a magnetic flux generated from the magnet when a demagnetization current is caused to flow. That is, it is desired that an absolute value of the demagnetization factor be small (upward direction of the vertical axis in the graph of FIG. 9) because the demagnetization resistance is excellent. As understood from FIG. 6 and FIG. 9, the point at which the torque becomes maximum is a point in time when L/D=0.044, and the point at which the demagnetization factor (absolute value) becomes minimum is a point in time when L/D=0.039. In the demagnetization factor in FIG. 9, when L/D is 0.035 or smaller, the slope of the demagnetization factor characteristic becomes steeper. When L/D is smaller than 0.035, there is a fear in that the demagnetization resistance may be degraded to degrade quality. Similarly, when L/D is 0.045 or larger, the slope of the demagnetization factor characteristic becomes steeper. When L/D is larger than 0.045, the demagnetization resistance is degraded. As described above, the range of L/D is set to 0.035≤L/D≤0.045, thereby satisfying both higher torque and improvement in demagnetization resistance. Consequently, the performance of the interior permanent magnet motor of the present invention can be maximized.

According to the above-mentioned first embodiment, it is possible to provide the interior permanent magnet motor, which is excellent in demagnetization resistance and is capable of maintaining a high output torque without relying on a high residual flux density of the rare-earth magnets.

Second Embodiment

Next, as a second embodiment of the present invention, there is described a rotary compressor having the interior permanent magnet motor according to the above-mentioned first embodiment mounted therein. Note that, the present invention encompasses a compressor having the interior permanent magnet motor according to the above-mentioned first embodiment mounted therein. However, the type of the compressor is not limited to the rotary compressor.

Figure 10:
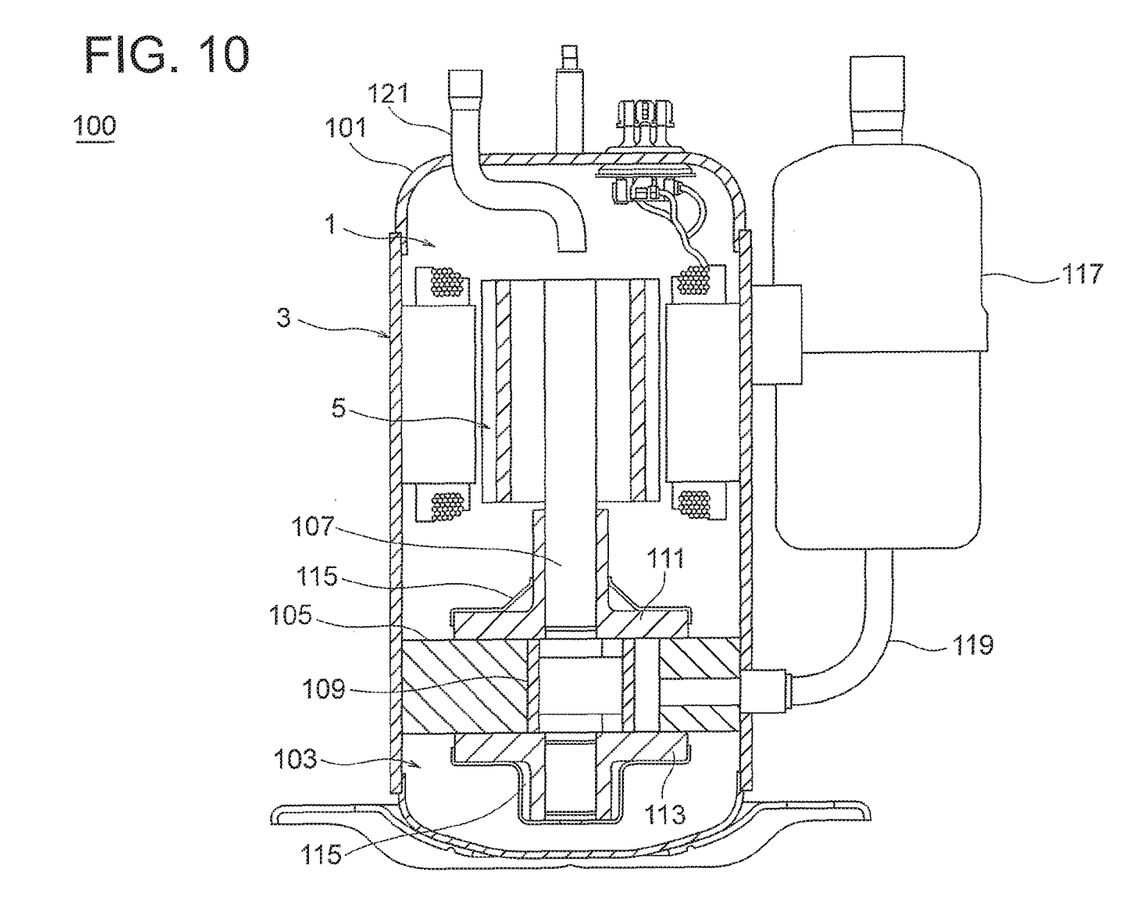
FIG. 10 is a vertical sectional view of a rotary compressor having the interior permanent magnet motor mounted therein according to a second embodiment of the present invention.

FIG. 8 is a vertical sectional view of the rotary compressor having the interior permanent magnet motor mounted therein. A rotary compressor 100 includes the interior permanent magnet motor 1 (motor element) and a compression element 103 in an airtight container 101. Although not illustrated, a refrigerating machine oil for lubricating each of sliding portions of the compression element 103 is stored in a bottom portion of the airtight container 101.

The compression element 103 includes, as main components thereof, a cylinder 105 arranged in a vertically stacked state, a rotary shaft 107 serving as a shaft rotated by the interior permanent magnet motor 1, a piston 109 to be fitted by insertion into the rotary shaft 107, a vane (not shown) dividing an inside of the cylinder 105 into an intake side and a compression side, an upper frame 111 and a lower frame 113 being a pair of upper and lower frames into which the rotary shaft 107 is to be rotatably fitted by insertion and which are configured to close axial end surfaces of the cylinder 105, and mufflers 115 mounted on the upper frame 111 and the lower frame 113, respectively.

The stator 3 of the interior permanent magnet motor 1 is directly fixed to the airtight container 101 by a method such as shrink fitting or welding and is held thereby. A coil of the stator 3 is supplied with power from a glass terminal fixed to the airtight container 101.

The rotor 5 is arranged through intermediation of an air gap on a radially inner side of the stator 3, and is held in a rotatable state by bearing portions (upper frame 111 and lower frame 113) of the compression element 103 via the rotary shaft 107 (shaft 13) in the center portion of the rotor 5.

Next, an operation of the rotary compressor 100 is described. A refrigerant gas supplied from an accumulator 117 is taken into the cylinder 105 through an intake pipe 119 fixed to the airtight container 101. The interior permanent magnet motor 1 is rotated by energization of an inverter so that the piston 109 fitted to the rotary shaft 107 is rotated in the cylinder 105. With this, the refrigerant is compressed in the cylinder 105. The refrigerant, which has passed through the muffler 115, rises in the airtight container 101. At this time, the refrigerating machine oil is mixed into the compressed refrigerant. When the mixture of the refrigerant and the refrigerating machine oil passes through air holes 71 formed in the rotor core 11, the refrigerant and the refrigerating machine oil are promoted to be separated from each other, and hence the refrigerating machine oil can be prevented from flowing into a discharge pipe 121. In this manner, the compressed refrigerant is supplied on a high-pressure side of the refrigeration cycle through the discharge pipe 121 arranged on the airtight container 101.

Note that, as the refrigerant for the rotary compressor 100, R410A, R407C, R22, or the like that has hitherto been used may be used, but any refrigerant such as a refrigerant having a low global warming potential (GWP) can also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf (CF3CF=CH2) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practice.

Also in the rotary compressor according to the second embodiment, which is constructed as described above, advantages similar to the advantages of the first embodiment described above are obtained.

Third Embodiment

Further, the present invention may be carried out as a refrigeration and air conditioning apparatus including the compressor according to the above-mentioned second embodiment as a component of a refrigeration cycle. Note that, configurations of components other than the compressor of the refrigeration cycle of the refrigeration and air conditioning apparatus are not particularly limited.

According to the third embodiment, the following advantage can be obtained in addition to the advantages of the above-mentioned first embodiment. A compressor for refrigeration and air conditioning is used in a temperature range of from low to high. Thus, it can be said that a motor that places importance on a magnet torque having temperature dependence is low in durability against the temperature. However, in the motor of the third embodiment, the rate of usage of a reluctance torque not having temperature dependence is increased. Accordingly, the durability against the temperature is improved. Thus, the compressor for refrigeration and air conditioning of the third embodiment is excellent in temperature durability during the operation.

In the above, the details of the present invention are specifically described referring to the preferred embodiments. However, it is apparent to those skilled in the art that various modifications may be made based on the basic technical concept and the teachings of the present invention.

REFERENCE SIGNS LIST 1 interior permanent magnet motor, 3 stator, 5 rotor, 11 rotor core, 19 permanent magnet, 21 magnet insertion hole, 53 radially-inner insertion hole contour surface, 55 radially-outer insertion hole contour surface, 100 rotary compressor, 101 airtight container, 103 compression element

The invention claimed is:
1. An interior permanent magnet motor, comprising:
a stator; and
a rotor rotatably arranged so as to be opposed to the stator,
wherein the rotor comprises a rotor core having a plurality of magnet insertion holes formed therein, into which corresponding permanent magnets are respectively inserted,
wherein the plurality of permanent magnets and the plurality of magnet insertion holes are each formed into an arc shape that is convex toward a center side of the rotor, and
wherein, when a shortest distance between the adjacent magnet insertion holes is defined as an inter-pole shortest distance (L), a ratio of the inter-pole shortest distance (L) to an outer diameter (D) of the rotor is $0.035 \leq L/D \leq 0.045$.

2. The interior permanent magnet motor according to claim 1, wherein the permanent magnets comprise ferrite magnets.

3. The interior permanent magnet motor according to claim 1, wherein a center of an arc of a radially-inner insertion hole contour surface of the magnet insertion hole and a center of an arc of a radially-outer insertion hole contour surface of the magnet insertion hole coincide with each other.

4. The compressor, comprising, in an airtight container:
a motor; and
a compression element,
wherein the motor comprises the interior permanent magnet motor of claim 1.

5. The refrigeration and air conditioning apparatus, comprising the compressor of claim 4 as a component of a refrigeration cycle.

6. An interior permanent magnet motor, comprising:
a stator; and
a rotor rotatably arranged so as to be opposed to the stator,
wherein the rotor comprises a rotor core having a plurality of magnet insertion holes formed therein, into which corresponding permanent magnets are respectively inserted,
wherein the plurality of permanent magnets and the plurality of magnet insertion holes are each formed into an arc shape that is convex toward a center side of the rotor,
wherein, when a shortest distance between the adjacent magnet insertion holes is defined as an inter-pole shortest distance (L), a ratio of the inter-pole shortest distance (L) to an outer diameter (D) of the rotor is $0.035 \leq L/D \leq 0.045$,
wherein the permanent magnets comprise ferrite magnets, and
wherein a center of an arc of a radially-inner insertion hole contour surface of the magnet insertion hole and a center of an arc of a radially-outer insertion hole contour surface of the magnet insertion hole coincide with each other.

* * * * *